United States Patent [19]

Best

[11] E Re. 30,838

[45] Reissued Dec. 29, 1981

[54] ELECTRICAL HEATING ELEMENT

[75] Inventor: Lorne A. Best, West Bloomfield, Mich.

[73] Assignee: National Element, Inc., Troy, Mich.

[21] Appl. No.: 95,830

[22] Filed: Nov. 19, 1979

Related U.S. Patent Documents

Reissue of:

[64] Patent No.: 4,016,403
Issued: Apr. 5, 1977
Appl. No.: 717,729
Filed: Aug. 24, 1976

U.S. Applications:

[63] Continuation of Ser. No. 573,739, May 1, 1975, abandoned.

[51] Int. Cl.[3] ..... H05B 3/02

[52] U.S. Cl. ..... 219/550; 13/25; 219/523; 219/536; 219/552

[58] Field of Search ..... 174/138 J; 219/331, 219/390, 408, 523, 536, 537, 538, 539, 541, 542, 544, 550, 552, 553; 25/20, 22, 25; 338/213, 214

[56] References Cited

U.S. PATENT DOCUMENTS

| | | | |
|---|---|---|---|
| 1,407,918 | 2/1922 | Bernard | 338/236 |
| 1,495,503 | 5/1924 | Armstrong | 13/25 X |
| 1,526,843 | 2/1925 | Dominguez | 338/317 |
| 1,618,364 | 2/1927 | Clark et al. | 219/550 |
| 2,097,981 | 11/1937 | Karcher | 338/235 X |
| 2,888,546 | 5/1959 | Kinney | 219/523 X |
| 3,045,097 | 7/1962 | Sellers | 219/539 |
| 3,202,750 | 8/1965 | Malm et al. | 13/25 |
| 3,395,241 | 7/1968 | Roman | 13/25 |
| 3,694,628 | 9/1972 | McGuire et al. | 219/550 |
| 3,718,806 | 2/1973 | Potter | 219/550 |
| 4,016,403 | 4/1977 | Best | 219/550 |
| 4,179,603 | 12/1979 | Zeigler | 219/538 |

FOREIGN PATENT DOCUMENTS

| | | | |
|---|---|---|---|
| 411462 | 3/1925 | Fed. Rep. of Germany | 219/550 |
| 1809436 | 11/1968 | Fed. Rep. of Germany . | |
| 705538 | 3/1931 | France | 219/550 |
| 281571 | 7/1927 | United Kingdom . | |
| 316463 | 8/1929 | United Kingdom | 219/550 |
| 462305 | 3/1937 | United Kingdom . | |
| 643357 | 12/1946 | United Kingdom . | |
| 1326536 | 8/1973 | United Kingdom . | |

*Primary Examiner*—Volodymyr Y. Mayewsky
*Attorney, Agent, or Firm*—Cullen, Sloman, Cantor, Grauer, Scott & Rutherford

[57] ABSTRACT

An improved electrical heating element for a high-temperature furnace including a support structure and an electrical-heating assembly. The support structure includes a plurality of thin, flat, non-conductive plates each having a plurality of spaced apertures therethrough and a plurality of non-conductive spacers smaller than the plates with one spacer interposed between each pair of adjacent plates. The electrical-heating assembly includes a plurality of elongated electrical conductors, preferably U-shaped, each leg extending through one aperture in each plate radially outwardly of the spacers. The conductors are supported by and extend between the plates and the ends of the conductors are interconnected so that the conductors as interconnected define a single tortuous electrical path radially outwardly of the spacers. The [interconnection] *interconnections* between the conductors maintain the support structure in assembly.

38 Claims, 6 Drawing Figures

FIG. 1
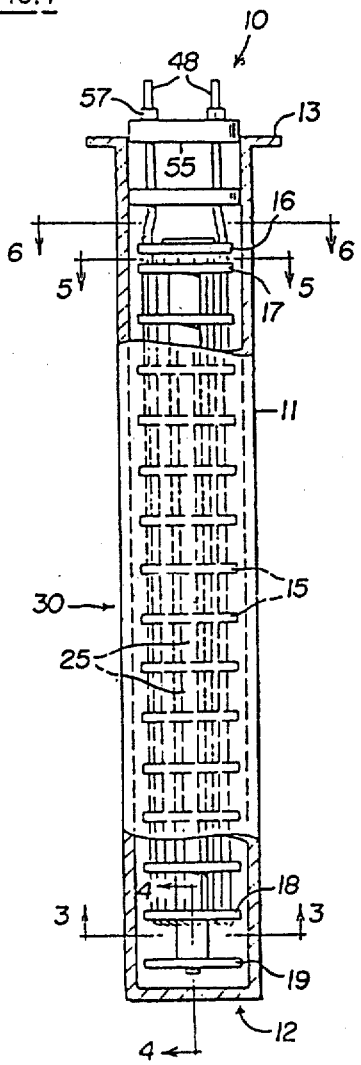
FIG. 3
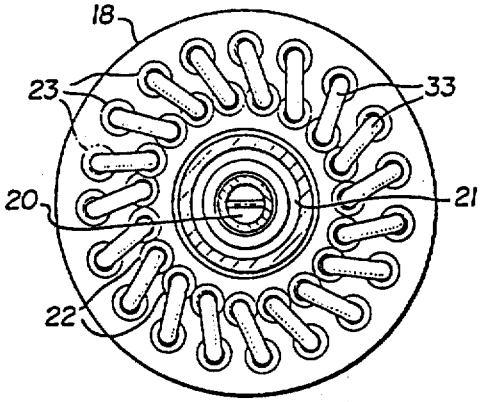
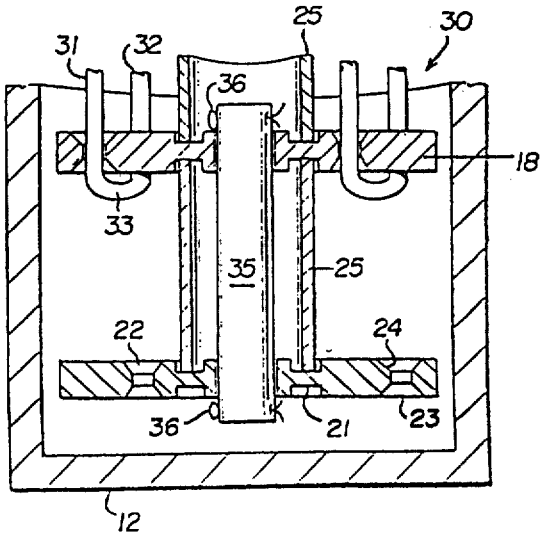
FIG. 4

ELECTRICAL HEATING ELEMENT

Matter enclosed in heavy brackets [ ] appears in the original patent but forms no part of this reissue specification; matter printed in italics indicates the additions made by reissue.

This is a continuation of application Ser. No. 573,739 filed May 1, 1975 *now abandoned.*

BACKGROUND OF THE INVENTION

This invention relates generally to heating elements for high-temperature furnaces and, more particularly, to an improved heating element for use in a radiant tube heater in a high-temperature furnace.

The use of radiant tube heaters positioned in high-temperature heat-treating furnaces is, of course, well known. Typically, in the prior art, the interior of a tubular member was gas-fired to heat the tubular member. The tubular member then radiated the heat outwardly into the furnace.

There were various difficulties and problems with gas-fired radiant tube heaters, the most significant of which were the relatively high cost and the low efficiency of gas heating.

*DESCRIPTION OF PRIOR ART*

The use of electrical heating elements interiorly of a radiant tube is also well known. However, various problems have been encountered with the prior art electrical-heating elements.

Typically, these electrical heating elements include a support structure having a hollow core and an electrical heating assembly. As current is passed through the electrical-heating assembly, the heating assembly radiates heat to the radiant tube, which in turn radiates heat into the furnace.

In the prior art electrical-heating elements, the current-return path from the distal end of the heating element (interiorly of the furnace) to the near end of the heating element (exteriorly of the furnace) was interiorly of the hollow core of the support structure. Thus, any heat generated by current flowing through the conductors in the return path interiorly of the core was substantially of no use in the overall heat generation of the assembly interiorly of the radiant tube.

Yet another problem in the prior art electrical-heating elements is the aging of the electrical conductor. This aging is manifested as oxidation, pitting or corrosion of the conductors. As this condition progresses, small holes appear in the conductors and as these holes become larger and ultimately sever the conductors, the conductors become useless and must be replaced.

Still another problem of the prior art electrical heating elements is lack of stability, i.e., sagging and growth. Sagging is the deviation from the original longitudinal axis and growth is axial elongation, both of which occur during high temperature use of the heating elements.

*A first type of prior art device utilizes thin wires, wire ribbons or spiral wound wires as the heating element. This is exemplified by prior art cited during the prosecution of the original patent such as U.S. Pats. 1,407,918; 1,526,843; 1,618,364; 2,097,981; 3,045,097; and 3,718,806; French Patent 705,538, British Patent 316,463, and German Patent 411,462. Additional prior art of this type includes British Patents 281,571; 1,326,536; and 462,305. The heating elements of these types of devices all are characterized by the aforementioned problems of oxidation, pitting and corrosion, as well as lack of stability or sagging.*

*A second type of prior art device includes a single row of straight or U-shaped rods. This is exemplified by prior art cited during the prosecution of the original patent, such as U.S. Pats. 1,495,503; 2,888,546; 3,202,750; 3,395,241; and 3,694,628. Additional prior art of this type includes British Patent 643,357 and German Patent 1,809,436 as well as commercial devices substantially the same as this German Patent.*

*This type of prior art is characterized by certain problems including sagging as heretofore mentioned, and the fact that graphite rods as disclosed in U.S. Pat. 3,395,241 cannot be used in a closed radiant tube furnace.*

*Yet another problem with these prior art devices is the limitation on resistance of the heating elements. In an industrial furnace, the power source is typically three phase and 480 volts or greater, and applying Ohm's law it is found that the total resistance of a single row of conductors is insufficient. Thus the prior art devices would draw too much current in the absence of a step down transformer. The present invention, by providing a pair of rows of conductors increases the total resistance so that no transformer is required. The unexpected synergisms are first, that there is no arcing or shorting between the conductors and second the conductors don't radiate against each other.*

SUMMARY OF THE INVENTION

The present invention overcomes the aforementioned problems by the provision of a new and improved electrical heating element. The heating element of the present invention has its entire electrical path outwardly of the central core so that the entire electrical path generates useable heat for heating the radiant tube or furnace.

Furthermore, the present invention also includes the provision of electrical conductors of a sufficiently thick cross section to reduce oxidation and corrosion. Furthermore, the present invention permits the replacement of those conductors which are pitted, oxidized or corroded without necessitating replacement of the entire electrical assembly. Finally the support structure avoids sagging and resultant axial growth.

It is, therefore, an object of the present invention to provide an improved electrical heating element for a high-temperature furnace or the like, including a support structure having a plurality of thin, flat, non-conductive plates each having [an plurality] *a pair* of *rows of* spaced apertures therethrough, and a plurality of non-conductive spacers smaller than the plates with a spacer interposed between each pair of adjacent plates, and an electrical-heating assembly having a plurality of conductors each extending through at least one aperture in each plate outwardly of the spacer. The conductors are supported by the plates and the ends of the conductors are interconnected so that the interconnected conductors define a single electrical path radially outwardly of the spacers. The interconnections between the conductors maintain the support structure in assembly.

It is another object of the present invention to provide an improved electrical heating element for insertion in a radiant tube of a high-temperature furnace or the like including a plurality of axially-spaced insulating discs each having a [plurality] *pair* of spaced *rows of* apertures parallel to the axis of the disc, a plurality of insulating spacers interposed between adjacent discs and separating the discs one from another, a plurality of conductive rods each having elongated legs and a base bight portion, the rod legs being inserted through aligned apertures in each of the discs to extend axially of the disc-spacer assembly and radially outwardly of the spacer, and the bight portion of each rod lying beyond the confines of the end plate, and further including conductive means retaining the rods, discs, and spacers in assembly and interconnecting the rods to provide a single continuous electrical flow path through each of the rods and outwardly of the spacers.

Yet another object of the present invention is the provision of an improved electrical beating element including a plurality of non-conductive longitudinally aligned spacers, a series of non-conductive plates each having a [plurality] *pair* of *rows of* apertures extending axially therethrough with the plates being maintained in [aparallel] *a parallel* spaced apart relationship by having spacers interposed therebetween with the apertures in the plates being axially aligned, a plurality of elongated electrically-conductive rods each formed in a U-shaped configuration with a short base and parallel-elongated legs, each leg of each rod being inserted axially through the aligned apertures in the series of plates to lie radially outwardly of the spacers and means for interconnecting the free end of each rod leg, with the exception of two rod legs, to the free end of the leg of a different rod to form the rods into a single electrical path, the remaining two rod legs being adapted for connection to an electrical power source.

BRIEF DESCRIPTION OF THE DRAWINGS

The foregoing objects and advantages of the present invention, together with other objects and advantages which may be attained by its use, will become more apparent upon reading the following detailed description taken in conjunction with the drawings. In the drawings, wherein like reference numerals identify corresponding elements:

FIG. 1 is an illustration, partly broken away, of the electrical heating element of the present invention inserted in a radiant tube;

FIG. 3 is an illustration of the electrical heating element of FIG. 1 as seen in the plane of arrows 3—3 with the radiant tube removed;

FIG. 4 is an illustration of the distal end of the electrical heating element as seen in the plane of arrows 4—4 of FIG. 1;

DETAILED DESCRIPTION OF THE INVENTION

Figure 2:
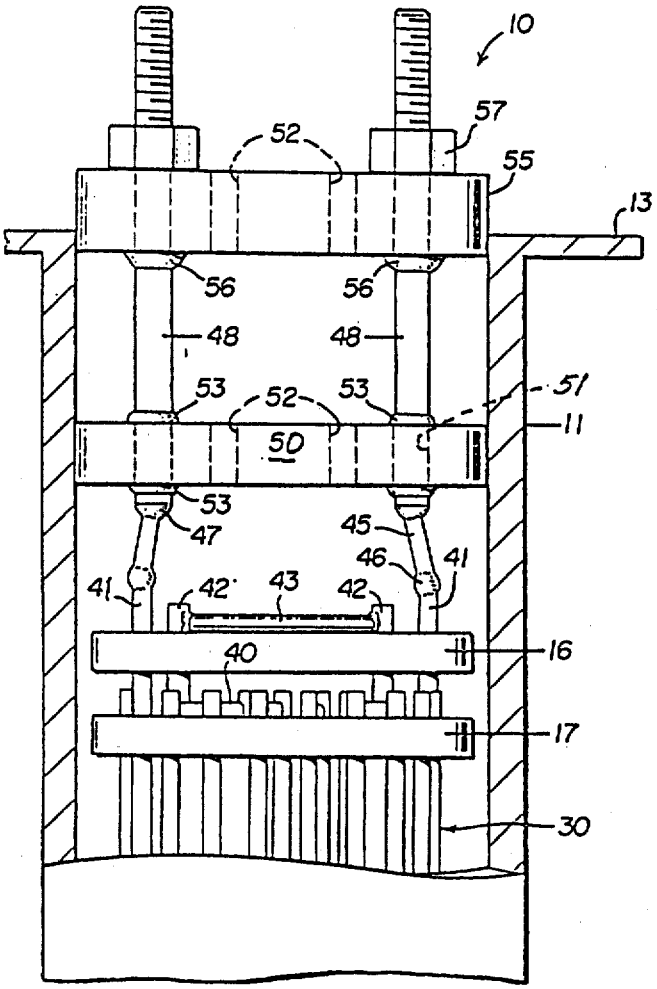
FIG. 2 is an enlarged view of the front end of the electrical heating element.

The electrical heating element 10 of the present invention is illustrated in FIG. 1 positioned in a hollow tube 11 having a closed distal end 12 and a flanged front end 13 for attachment to a furnace. The tube 11 is preferably of a heat-resistant alloy such as incanel although a steel pipe could be used in a lower temperature furnace. The support structure of the electrical heating element of the present invention includes a plurality of thin, flat ceramic plates or discs 15 including first and second plates 16,17 respectively at the front or first end of the assembly, and penultimate and last plates 18 and 19 at the distal end of the assembly.

Each of the plates are preferably identical and have a central axial bore 20 which is surrounded by a circular groove 21 on each side of the plate. Each plate has a plurality of apertures therethrough parallel to the axis of the plate. These apertures are arranged in a plurality of rows and as illustrated in FIG. 3, there is a first circular row of apertures 22 and a second circular row of apertures 23 with all the apertures being chamfered as at 24. The rows of apertures are radially spaced apart and, in a preferred embodiment, the apertures are radially spaced apart and, in a preferred embodiment, the apertures 22 are offset angularly with respect to the apertures 23 to provide a maximum direct exposure of the surface of current-carrying conductors to the radiant tube.

The support structure also includes a plurality of identical non-conductive spacers 25, also made of a ceramic material, preferably hollow and open at both ends. The diameter of the spacers 25 corresponds to the diameter of the circular groove 21 in each plate, and it is important that the diameter of the spacers 25 is sufficiently less than the diameter of the plates 15 so that all the apertures 22,23 are radially outwardly of the spacers 25. One spacer 25 is interposed between each pair of adjacent plates 15 as illustrated in FIG. 1. Hence, the spacers serve to separate the adjacent plates.

The electrical heating assembly of the present invention will now be explained. The present invention includes a plurality of electrical conductors which, in the preferred embodiment, are solid rods of a circular cross section with the conductors or rods having a generally hairpin or U-shape. The use of a rod of a circular cross section provides a maximum thickness-to-surface area ratio. This provides longer life as contrasted to the prior art electrical heating elements since the thickness of the rod reduces the opportunity for oxidation, pitting or corrosion to penetrate entirely through the rod.

Each conductor or rod 30 includes two elongated parallel legs 31,32 which are joined together by a base or bight 33.

When the support structure is assembled, the apertures in each of the plates are aligned and each rod leg is inserted through the series of aligned apertures parallel to the axes of the plates. The rods are first inserted through the penultimate plate 18 with the bight 33, which forms a connection between the legs 31 and 32 of each rod, lying beyond the confines of the end or penultimate plate 18. Thus, the rods extend through each plate and between the adjacent plates from the penultimate plate 18 through each plate 15 to the second plate 17 and the distance between plates 17 and 18 define the effective heating length of the heating element 10. Each plate supports the rods 30 and the base or bight portion 33 of each rod serves to maintain the distal end of the structure in assembly.

Additional support means are provided at the distal end of the heating element 10 to both support the assembly and to prevent electrical contact between the base 33 of the rod and the end 12 of the radiant tube. In a preferred embodiment, this includes a spacer 25 and the last plate 19. A pin 35, such as an 18-chrome, 8-nickel, stainless steel pin, is inserted interiorly of the spacer 25. The pin has apertures at each end to receive cotter pins 36. The cotter pins and stainless steel pin prevent the penultimate plate 18 and the last plate 19 from separating and the spacer 25 prevents these two plates from moving closer together.

During assembly of the heating element 10, the rods 30 are inserted through the apertures 22,23 of the penultimate plate 18. Then, the support structure of the stainless steel pin 35, spacer 25 and the last plate 19 is assembled. Finally, the remaining support structure including the plates 15 and 17 and spacers 25 are assembled with the rods extending through the aligned apertures 22,23 in each plate.

Figure 6:
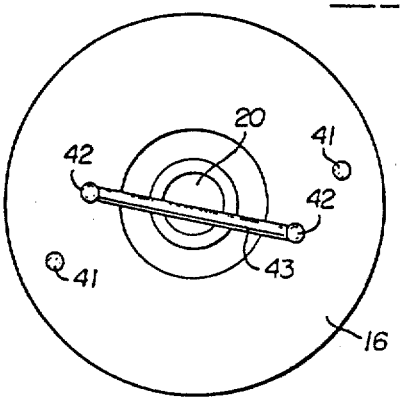
FIG. 6 is an illustration of the front end of the electrical heating element of the present invention as seen in the plane of arrows 6—6 of FIG. 1.
Figure 5:
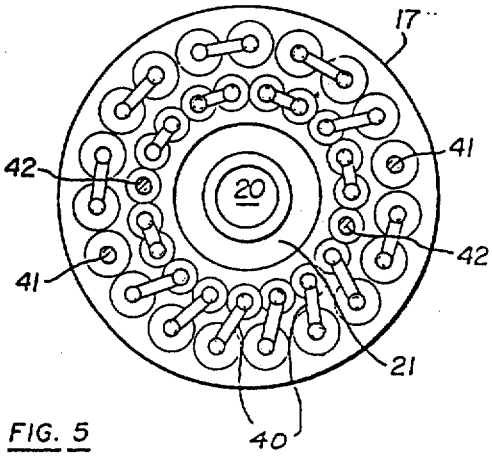
FIG. 5 is an illustration of the front end of the electrical heating element as seen in the plane of arrows 5—5 of FIG. 1.

Means are provided for electrically interconnecting the free ends of the legs 31,32 of the rods and for maintaining the support structure of the plates and spacers in assembly. With respect to FIGS. 2, 5 and 6, all the legs 31,32 of the rods 30 are illustrated as extending through the apertures in the second ceramic plate 17. A series of jumper rods 40 are illustrated in FIG. 5. These jumper rods 40, which are of the same size and material as the conductive rods 30, are welded from the free end of one leg 31 of a U-shaped conductor to the free end of a leg of a different U-shaped conductor. The interconnection of the free ends of the legs of the conductive rods is accomplished with four legs of four different U-shaped rods remaining unconnected as illustrated in FIG. 5 by the four leg ends 41,42.

Then, the first ceramic plate 16 is placed into position with the four leg ends 41,42 extending therethrough. A crossover bar 43 of the same material as the jumper rods 40 and conductors 30 is then welded to two of the free leg ends 42. This leaves the two leg ends 41 free of the interconnection but at the same time provides a continuous electrical path from one free leg end 41 along a path through each U-shaped conductor and each jumper rod and the crossover which electrical path emerges at the other free leg end 41. The entire electrical path, therefore, is radially outwardly of the spacers 25.

With reference to FIGS. 1 and 2, the remainder of the support assembly and electrical connection will now be explained. It is preferable to reduce the distance between the two free leg ends 41 of the rod to a diameter more suitable for interconnection to an electrical supply source and, at the same time, provide terminals of a greater thickness for such interconnections. Furthermore, it is desired to provide additional support for this first end of the heating element. To accomplish this, two rods 45 of the same material as the conductors 30 but of a slightly greater diameter are welded as at 46 to the free leg ends 41. The upper ends of the rods 45 are welded as at 47 to the ends of two terminal rods 48 which are preferably 35–15 stainless steel. These terminal rods 48 are of 0.625 inch diameter. The terminal rods are inserted through a first insulating block 50 which has two holes 51 therethrough to receive the terminal rods 48 and two additional vent holes 52 therethrough. Washers 53 are welded to the terminal rods on both sides of the first insulating block 50. A satisfactory insulating block is a Marinite disc manufactured by the John Mansville Company.

The terminal rods extend through a second Marinite block 55 and washers 56 are welded to the terminal rods 48 interiorly of the second insulating block 55. The terminal rods are suitably threaded to receive lug nuts 57 which secure the second insulating block 55 against the washers 56.

A heating element manufactured in accordance with the principles of the present invention was tested with the following results. Insulating plates 15 were made of a 4.875 inch diameter, 0.5 inch thickness having 17 apertures in the outer row and 17 apertures in the inner row. Then, 17 U-shaped conductors were inserted therethrough and the assembly was placed in a pipe having a 6 inch outside diameter. The effective heating length of the assembly was 42 inches. Thermocouples were placed inside of and exteriorly of the pipe. Power was applied at various voltages between 45–60 volts and at various currents from 30–45 amps. (The heating element is rated at 137 volts). The temperature of the tube was maintained at 2200° F. for 24 hours as part of the testing and at times exceeded 2300° F. Similar tests were run on a larger version with a lower current rating and the temperature exteriorly of the pipe exceeded 1700° F.

The important result of these tests were that there was no measurable sag (variations relative to the longitudinal axis) and no measurable growth of the element (variations in axial length) during the testing. Although these tests were not carried out under actual operating conditions, the test results indicate that the necessary operating conditions of heating a furnace to 2000° F. are obtainable with the present invention and will not result in measurable sag or growth of the electrical heating element.

It must be appreciated that many changes and modifications may be made without departing from the spirit and scope of the present invention. While the use of U-shaped rods, which are easily individually replaceable in the event that a single rod corrodes has been described, it is equally feasible to use straight rods and weld at both ends. Similarly, depending upon the atmosphere of the heat treating furnace, it is possible to utilize the present heating element without a radiant tube. Furthermore, the spacers of the present invention are hollow although this is not necessary as other as other arrangements can be made for securing the last plate 19 to the penultimate plate 18. Therefore, the scope of the present invention should be measured only by the following claims:

What is claimed is:

1. In a high temperature closed radiant tube furnace, the improvement of an electrical heating element positioned in said closed radiant tube, said radiant tube operable at temperatures in excess of 1500° F. comprising:

a support structure having (a) a plurality of thin, flat, non-conductive plates, each plate having a [plurality] *pair* of spaced *apart rows of* apertures therethrough parallel to the axis of the plate, and (b) a plurality of non-conductive spacers of a size smaller than said plates, one of said spacers being positioned between each pair of adjacent plates, and an electrical heating assembly having a plurality of elongated rigid electrical conductors, each extending through at least one aperture in each plate radially outwardly of said spacers, each conductor being straight between adjacent plates, each of said conductors being supported by and extending between said plates; said straight rigid conductors being free of contact with said radiant tube; the ends of the conductors being interconnected so that the interconnected conductors define a single tortuous electrical path radially outwardly of said spacers; the conductors as interconnected maintaining said support structure in assembly.

2. The invention as defined in claim 1 wherein each of said conductors has two elongated legs joined by a base;

each leg extending through one aperture of *a corresponding row of* each plate; and the bases of the conductors being positioned beyond the end plate to form said interconnections at one end of said assembly.

3. The invention as defined in claim 1 wherein said spacers are longitudinally aligned on a common axis and said electrical conductors are parallel to said axis.

4. The invention as defined in claim 1 wherein the apertures in each plate are arranged in adjacent spaced-apart rows.

5. The invention as defined in claim 4 wherein said rows are circular and radially spaced apart, and wherein the apertures are angularly offset between adjacent rows.

6. The invention as defined in claim 1 and further including an additional non-conductive plate spaced apart from and secured to the plate at one end of said support structure axially away from said conductors for isolating said conductors from contacting said radiant tube.

7. An improved electrical heating element for a radiant tube heater in a high temperature furnace or the like, comprising:

at least three axially spaced insulating discs each having a [plurality] *pair* of *rows of* spaced apertures parallel to the axis of the disc;

a plurality of insulating spacers interposed between adjacent discs and spacing the discs from one another;

a plurality of conductive metal rods each having elongated straight legs and a base bight portion, the straight rod legs being inserted through aligned apertures in each of the discs to extend axially of the disc-spacer assembly and radially outwardly of the spacer and the bight portion of each rod lying beyond the confines of the end most disc; and conductive means retaining the rods, the discs and the spacers in assembly and interconnecting the rods to provide a single continuous electrical flow path through each of said rods.

8. The invention as defined in claim 7 wherein said conductive means includes a plurality of jumper rods, each jumper rod interconnecting the free end of each rod leg with the free end of the leg of a different rod and with two legs of different rods remaining free of jumper rod interconnection and being adapted for connection to an electrical power source.

9. In an electrical heating element for a radiant tube heater or the like comprising a plurality of hollow, non-conductive, longitudinally aligned spacers; a series of thin, flat, non-conductive plates each having a plurality of apertures extending axially therethrough, the apertures in each plate being arranged in a plurality of rows; said plates being maintained in a parallel, spaced apart relationship by the spacers interposed therebetween with the apertures in the plates being axially aligned; the improvement of:

a plurality of elongated electrically conductive rods each formed in a U-shaped configuration with a short base and parallel elongated legs; each leg of each rod being inserted axially through the aligned apertures in the series of plates to lie radially outwardly of the spacers; the bases of the rods extending beyond the end plate; said end plate including a central axial bore radially interiorly of the spacer; and an additional non-conductive plate identical to said end plate, and an additional spacer for further supporting the heating element and for isolating the bases of the rods from contacting the radiant tube, the additional plate being positioned away from said end plate and secured thereto by an axial pin extending through said spacer and the central axial bore of the end plate and the additional plate, said axial pin secured inwardly of the end plate and outwardly of the additional plate; and means for electrically interconnecting the free end of each rod leg, with the exception of two legs of different rods, to the free end of a leg of a different rod at a first end of the heating element, to form the rods into a single electrical path, the remaining two rod legs being adapted for connection to an electrical power source.

10. The invention as defined in claim 9 wherein the short base of each of said U-shaped rods is integrally joined to each of said parallel legs.

11. In a high temperature closed radiant tube furnace, the improvement of an electrical heating element positioned in said closed radiant tube, said radiant tube operable at temperatures in excess of 1500° F. comprising:

a support structure comprising a plurality of plate-spacer units, each plate thereof being thin, flat, non-conductive and having a [plurality] *pair* of spaced *rows of* apertures therethrough parallel to the axis of the plate, and each spacer thereof being non-conductive and of a size smaller than said plates, said plate-spacer units being positioned so that a spacer thereof is between each pair of adjacent plates, and an electrical heating element assembly having a plurality of elongated rigid electrical conductors, each extending through at least one *corresponding* aperture in each plate radially outwardly of said spacers, each conductor being straight between adjacent plates, each of said conductors being supported by and extending between said plates; said straight rigid conductors being free of contact with said radiant tube; the ends of the conductors being interconnected so that the interconnected conductors define a single tortuous electrical path radially outwardly of said spacers; the conductors as interconnected maintaining said support structure in assembly.

12. The invention as defined in claim 11 wherein each plate-spacer unit includes a plate and a separate discrete spacer.

13. The invention as defined in claim 11 and further including an additional non-conductive plate spaced apart from and secured to the plate-spacer unit at one end of said support structure, axially away from said conductors, for isolating said conductors from contacting said radiant tube.

14. An improved electric heating element for a radiant tube heater in a high temperature furnace or the like comprising:

at least three insulating disc-spacer units each disc thereof having a [plurality] *pair* of spaced apart *rows of* apertures extending therethrough parallel to the axis of the disc;

the disc-spacer units being positioned so that a spacer thereof is interposed between adjacent discs thereof to space the discs from one another;

a plurality of conductive metal rods each having a pair of elongated rigid legs interconnected by a rigid base portion, the rigid legs being inserted through *corresponding* aligned apertures in each of the discs of the disc-spacer units to extend parallel to the longitudinal axis of the discs thereof and radially outwardly of the spacers thereof, and the rigid base portion of each rod lying beyond the confines of the disc of the end most disc-spacer unit; and conductive means retaining the rods and the disc-spacer units in assembly and interconnecting the rods to provide a single continuous electrical flow path through each of said rods.

15. The invention as defined in claim 14 wherein each of said disc-spacer units includes a thin, flat insulating disc and a separate insulating spacer.

16. The invention as defined in claim 14 wherein each pair of rigid legs and the rigid base interconnecting them are of integral one piece construction.

17. In an electrical heating element for a radiant tube heater or the like comprising a plurality of non-conductive plate-spacer units, each spacer thereof being hollow, each plate thereof being thin, flat and having a plurality of apertures extending axially therethrough, the apertures in each plate thereof being arranged in a plurality of rows; said plates thereof being maintained in a parallel, spaced apart relationship by the spacers thereof with the apertures in the plates being aligned; the improvement of:

a plurality of pairs of elongated electrically conductive rigid rods, each rod being inserted axially through the aligned apertures in the plates to lie radially outwardly of the spacers; each pair of rods interconnected by a base, the bases extending beyond the end most plate-spacer unit, said end most plate including a central axial bore radially interiorly of its spacer; and an additional non-conductive thin flat apertured plate having a central axial bore and being spaced apart from said end most plate for further supporting the heating element and for isolating the bases from contacting the radiant tube, the additional plate being positioned away from said end most plate and secured thereto by an axial pin extending through its spacer and the central axial bore of said end most plate and of said additional plate, said axial pin secured inwardly of the end most plate and outwardly of the additional plate; and means for electrically interconnecting the free end of each rod, with the exception of two rods of different pairs of rods, to the free end of a rod of a different pair of rods at a first end of the heating element, to form the rods into a single electrical path, the remaining two rods being adapted for connection to an electrical power source.

18. The invention as defined in claim 17 wherein each plate-spacer unit comprises a plate and a discrete spacer.

19. The invention as defined in claim 17 wherein each pair of rigid rods and their associated base are of an integral, one piece construction.

20. The invention as defined in claim 17 wherein each plate-spacer unit comprises a plate and a discrete spacer and wherein each pair of rigid rods and their associated base are of an integral, one piece construction.

*21. The invention as defined in claim 7 wherein each straight rod leg is inserted through the aligned apertures of a corresponding row of each plate.*

*22. The invention as defined in claim 9 wherein each leg of each rod is inserted through the aligned aperture of a corresponding row of each plate.*

*23. The invention as defined in claim 17 wherein each rod of each pair of rods is inserted axially through aligned apertures of a corresponding row in each of the plates.*

*24. An electrical radiant heating element having a longitudinal axis and a plurality of thin, flat, non-conductive plates which are spaced axially apart along said longitudinal axis, each plate having a plurality of spaced apertures therethrough which are parallel to and are spaced laterally outwardly from said longitudinal axis, the apertures in each plate being arranged in a pair of laterally spaced apart circular rows, each of said rows of said plates having an equal number of apertures, the apertures of each row of each plate being respectively longitudinally aligned with the apertures in the corresponding row of the other plates, a plurality of longitudinally aligned non-conductive spacers located on said longitudinal axis and laterally inwardly of said apertures, each of said spacers abutting and engaging the opposing faces of a pair of adjacent plates for maintaining said plates parallel and spaced apart, and a plurality of elongated straight rigid electrical conductors extending parallel to said longitudinal axis and extending axially through the longitudinally aligned apertures in said plates and being supported thereby, and means at each end of the heating element for interconnecting the ends of said conductors to define a single continuous electrical flow path through said conductors.*

*25. The invention as defined in claim 24 wherein said pair of circular rows of apertures including an inner circular row and an outer circular row, with the apertures in the inner row being located closer together than the apertures in the outer row, and with the apertures in each row being equally spaced apart.*

*26. The invention as defined in claim 25 wherein each of said conductors are provided with two elongated legs joined by a base, each leg of each conductor extending through one aperture in each row of each plate, and the base of each conductor being positioned beyond an end plate to form at one end of the heating element said interconnecting means.*

*27. The invention as defined in claim 26 wherein the interconnecting means at the other end of the heating element includes a plurality of jumper rods, each jumper rod interconnecting the free end of each conductor leg with the free end of a different conductor leg and with two conductor legs of different conductors remaining free of jumper rod interconnection and being adapted for connection to an electrical power source.*

*28. The invention as defined in claim 24 wherein each spacer is separate from the plates, the opposing faces of adjacent plates being provided with circular grooves, with the end portions of each spacer being received in the grooves of adjacent plates.*

*29. An electrical heating element for a radiant tube heater comprising a plurality of hollow, non-conductive, longitudinally aligned spacers; a series of thin, flat, non-conductive plates each having a plurality of apertures extending axially therethrough, the apertures in each plate being arranged in a pair of circular rows; said plates being maintained in a parallel, spaced apart relationship by the spacers interposed therebetween with the apertures in the plates being axially aligned; a plurality of elongated electrically conductive rods each formed in a U-shaped configuration with a short base and parallel elongated legs; each leg of each rod being inserted axially through the aligned apertures in the series of plates to lie radially outwardly of the spacers; each leg of a rod inserted through a different row of apertures than the other leg of said rod; the bases of the rods extending beyond the end plate; said end plate including a central axial bore located radially interiorly of*

*the spacer; an additional non-conductive plate identical to said end plate, an additional spacer for further supporting the heating element and for isolating the base of the rods from contacting the radiant tube, the additional plate being positioned away from said end plate and secured thereto by an axial pin extending through said spacer and the central axial bore of the end plate and the additional plate, said axial pin being secured inwardly of the end plate and outwardly of the additional plate; and means for electrically interconnecting the free end of each rod leg, with the exception of two legs of different rods, to the free end of a leg of a different rod at a first end of the heating element, to form the rods into a single electrical path, the remaining two rod legs being adapted for connection to an electrical power source.*

*30. The invention as defined in claim 29, wherein the short base of each of said U-shaped rods is integrally joined to each of said parallel legs.*

*31. The invention as defined in claim 29 wherein said pair of circular rows of apertures including an inner circular row and an outer circular row, with the apertures in the inner row being located closer together than the apertures in the outer row, and with the apertures in each row being equally spaced apart.*

*32. The invention as defined in claim 29 wherein each spacer is separate from the plates, the opposing faces of adjacent plates being provided with circular grooves, with the end portions of each spacer being received in the grooves of adjacent plates.*

*33. An electrical heating element for a radiant tube heater comprising a plurality of non-conductive plate-spacer units, each spacer thereof being hollow, each plate thereof being thin, flat and having a plurality of apertures extending axially therethrough, the apertures in each plate thereof being arranged in a pair of circular rows; said plates thereof being maintained in a parallel, spaced apart relationship by the spacers thereof with the apertures in the plates being aligned; a plurality of pairs of elongated electrically conductive rigid rods, each rod being inserted axially through the aligned apertures in the plates to lie radially outwardly of the spacers; each pair of rods interconnected by a base, the bases extending beyond the end most plate-spacer unit; said end most plate including a central axial bore radially interiorly of its spacer; an additional non-conductive thin flat apertured plate having a central axial bore and being spaced apart from said end most plate for further supporting the heating element and for isolating the bases from contacting the radiant tube, the additional plate being positioned away from said end most plate and secured thereto by an axial pin extending through its spacer and the central axial bore of said end most plate and of said additional plate, said axial pin secured inwardly of the end most plate and outwardly of the additional plate; and means for electrically interconnecting the free end of said rod, with the exception of two rods of different pairs of rods, to the free end of a rod of a different pair of rods at a first end of the heating element, to form the rods into a single electrical path, the remaining two rods being adapted for connection to an electrical power source.*

*34. The invention as defined in claim 33 wherein each plate-spacer unit comprises a plate and a discrete spacer.*

*35. The invention as defined in claim 33 wherein each pair of rigid rods and their associated base are of an integral, one piece construction.*

*36. The invention as defined in claim 33 wherein each plate-spacer unit comprises a plate and a discrete spacer and wherein each pair of rigid rods and their associated base are of an integral, one piece construction.*

*37. The invention as defined in claim 33 wherein said pair of circular rows of apertures including an inner circular row and an outer circular row, with the apertures in the inner row being located closer together than the apertures in the outer row, and with the apertures in each row being equally spaced apart.*

*38. The invention as defined in claim 33 wherein the opposing faces of adjacent plates are provided with circular grooves, with the end portions of each spacer being received in the grooves of adjacent plates.*

* * * * *